May 9, 1933. J. A. WEIGER 1,908,089
WELDING ELECTRODE
Filed July 24, 1931
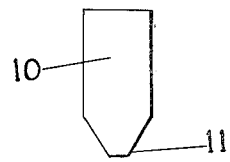
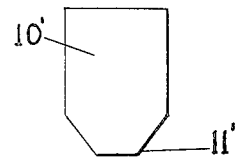
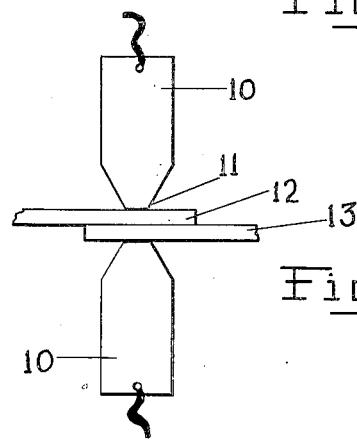
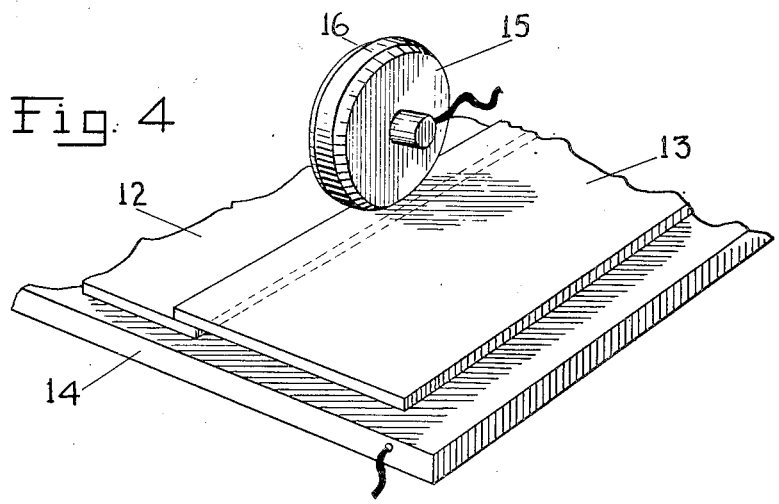
INVENTOR
Joseph A. Weiger
BY
Watson, Bristol, Johnson & Leavenworth
ATTORNEY Patented May 9, 1933

1,908,089

UNITED STATES PATENT OFFICE

JOSEPH A. WEIGER, OF INDIANAPOLIS, INDIANA, ASSIGNOR TO P. R. MALLORY & CO., INCORPORATED, OF INDIANAPOLIS, INDIANA, A CORPORATION OF INDIANA

WELDING ELECTRODE

Application filed July 24, 1931. Serial No. 552,828.

This invention relates to electrical resistance welding and more particularly to electrodes used in the resistance welding of lapped sheets of metal.

A general object of the invention is the provision of electrodes for the resistance welding, such as, for example, spot welding and seam welding, of lapped sheets of metal, formed from an alloy which has good electrical conductivity, extremely long service life and is of a hardness such as to efficiently withstand the pressure, a feature of this type of welding.

A more specific object of the invention is the provision of such an electrode which has an efficient electrical conductivity not much less than that of copper, is much harder than copper, has a service life of many times that of hard copper, the metal most commonly used for such electrodes prior to the present invention, can be cheaply produced and is free from the characteristics which have made disadvantageous for general use other alloys used for such electrodes prior to the present invention.

Other objects of the invention will in part be obvious and will in part appear hereinafter.

The invention accordingly comprises an article of manufacture possessing the features, properties, and the relation of elements which will be exemplified in the article hereinafter described and the scope of the application of which will be indicated in the claims.

In resistance welding sheets of metal are welded together by superimposing or lapping them face to face, clamping the lapped portions together by pressure welding electrodes and supplying welding current to the sheets through the electrodes. Prior to the present invention, resistance welding, such as, for example, spot welding and seam welding, has been commonly performed with the use of copper electrodes, although electrodes of some few metal alloys have been used to a limited degree. A relatively great amount of pressure applied through the electrodes is essential to efficient welding during the practice of such welding operations. Copper electrodes have a marked tendency to deform or "mushroom" under the pressure and high temperature of repeated welding operations. The few metal alloy electrodes which have been used prior to the present invention have been found to have characteristics which have made their use disadvantageous for certain purposes. The electrodes disclosed in the United States patents to Adams No. 1,552,184, issued September 1, 1925, and Gillette No. 1,539,810 issued May 26, 1925, have been found to be efficiently useful for certain specific purposes but due to various operating characteristics of these alloy electrodes they have not replaced copper electrodes for general purposes. The present alloy electrodes, however, have been found to be not only adapted for general purposes for which copper electrodes are commonly used but have been found to have better operating characteristics than do the copper electrodes in the same general fields of use and to overcome the difficulties characteristic of electrodes used prior to the present invention, some of which have been set forth above.

In accordance with the present invention an alloy is formed of copper and cadmium preferably in the proportions of about 99 per cent by weight of copper and 1 per cent by weight of cadmium. The electrical conductivity of the electrodes formed from the present alloy is found to be not less than 80 per cent of that of copper. The Rockwell hardness is found to be not less than 67 on the B scale using a $\frac{1}{16}$ inch diameter steel ball and a 100 kilogram load. Hard rolled copper under similar conditions shows a Rockwell hardness of from 34 to 38. Welding electrodes formed from this alloy are found by test to have a service life for spot welding of from 3 to 10 times that of copper and for seam welding of from $2\frac{1}{2}$ to 6 times that of copper. These electrodes are found to attain efficient welds of metal sheets over longer periods of use than has been possible with the use of copper electrodes, with a minimum maintenance cost, and to make commercially practicable the use of welding under a variety of conditions where the maintenance cost of copper electrodes has been commercially prohibitive.

For a fuller understanding of the nature and objects of the invention reference should be had to the following detailed description taken in connection with the accompanying drawing, in which:

Fig. 1 is a side elevational view of a form of welding pressure electrode made in accordance with the present invention.

Fig. 2 is a side elevation of another form of a welding pressure electrode.

Fig. 3 is an elevational view illustrating the application of the present invention in spot welding two sheets together.

Fig. 4 is a perspective view illustrating the application of the electrode alloy of the present invention to continuous seam welding.

Throughout the drawing like numerals refer to like parts. In Fig. 1 the electrode body 10 is integrally formed with the electrode point 11. This electrode comprising the body 10 and point 11 is formed from the present alloy, that is, copper and cadmium, although a small amount of other material, such as, for example, silicon may be added.

The shape of the welding electrode is relatively immaterial this being chiefly governed by the type of welding desired.

In Fig. 2 is shown an electrode of a shape to give a spot weld of greater surface area which can be used to advantage with relatively thin sheets of metal.

In Fig. 3 are shown two opposed electrodes of the type shown in Fig. 1 and described above, between which are clamped lapped sheets of metal 12 and 13. Pressure is applied to the supports in the usual manner and an electrical current is passed through the superimposed sheets of metal 12 and 13 between the electrodes 11—11 to obtain a spot weld.

Fig. 4 illustrates the use of electrodes of the present invention in seam welding wherein the lapped sheets of metal 12 and 13 are placed upon a suitable support 14 comprising one terminal of the circuit. This support may be provided, if desired, with a backing strip immediately adjacent the overlapped portions of the sheets to be seam welded together. A roller 15, provided with a circumferentially extending electrode rim 16 is formed from the alloy described herein. This roller 15 is preferably tapered in section to provide the electrode rim of the desired width and constitutes the other terminal of the circuit, the seam weld being obtained by traversing the roller along the lapped edges of the sheets of metal while pressure is being applied to the roller and current is being supplied to the circuit.

As set forth above, the present invention may be practiced by alloying copper and cadmium together and although the preferred percentages are given as about 99 per cent by weight of copper and about 1 per cent by weight of cadmium, these percentages can be varied somewhat without departing from the scope of the invention, the chief factor being that the percentage of copper should be relatively high and the percentage of cadmium should be relatively low.

The objects set forth above may be efficiently attained by adding to the alloy of copper and cadmium a slight amount of material, such as, silicon, which increases the hardness of the alloy, reduces the possibility of the electrode sticking to the sheets of metal, and introduces other characteristics desirable in welding pressure electrodes. When silicon is added, the preferred proportions are about 99 per cent by weight of copper, from about 0.9 to about 0.975 per cent by weight of cadmium and from about 0.1 to about 0.025 per cent by weight of silicon. The electrical conductivity of such an alloy should not be less than about 80 per cent of that of copper to insure efficient performance of a resistance welding electrode formed from the alloy.

It will thus be seen that the present invention efficiently attains the objects set forth by the provision of resistance welding electrodes formed from an alloy consisting chiefly of copper and containing a small percentage of cadmium and if desired a small percentage of another material, such as, for example, silicon, which have a conductivity not much less than that of copper, are much harder than copper, thus being able to withstand the high pressures and temperatures essential to efficient resistance welding, have much longer service life than have electrodes formed from copper, and require less frequent redressings than do copper electrodes.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. A welding electrode formed from a hard tough alloy having an electrical conductivity in the neighborhood of about 80 per cent of that of copper containing not more than 1.25 per cent by weight of cadmium with the remainder consisting chiefly of copper.

2. A welding electrode formed from a hard tough alloy having an electrical conductivity in the neighborhood of about 80 per cent of that of copper consisting of over 95 per cent by weight of copper, a small percentage of silicon and not more than about 1 per cent by weight of cadmium.

3. A welding electrode formed from an alloy consisting of about 99 per cent by weight of copper and a small percentage of cadmium and silicon, the cadmium being present in substantially greater amount than the silicon.

4. A welding electrode formed from an alloy consisting chiefly of copper and containing from about 0.9 to 0.975 per cent by weight of cadmium and from about 0.1 to 0.025 per cent by weight of silicon.

5. A welding electrode formed from an alloy consisting of about 99 per cent by weight of copper, from about 0.9 to 0.975 per cent by weight of cadmium and from about 0.1 to 0.025 per cent by weight of silicon.

6. A welding electrode formed from a hard tough alloy having an electrical conductivity in the neighborhood of about 80 per cent of that of copper, consisting of at least 98 per cent by weight of copper, not more than 1.25 per cent by weight of cadmium, and a small percentage of silicon.

In testimony whereof I affix my signature.

JOSEPH A. WEIGER.